United States Patent [19]

Wicki

[11] 4,097,476

[45] Jun. 27, 1978

[54] TRISAZO DYES HAVING A 2,7-(1-AMINO-3,6-OR 4,6-DISULFO-8-HYDROXYNAPHTHYLENE) RADICAL

[75] Inventor: Heinz Wicki, Basel, Switzerland

[73] Assignee: Sandoz Ltd., Basel, Switzerland

[21] Appl. No.: 585,663

[22] Filed: Jun. 10, 1975

[30] Foreign Application Priority Data

Jun. 17, 1974 Switzerland .................. 8252/74

[51] Int. Cl.² .................. C09B 31/24; D06P 1/06; D06P 3/32
[52] U.S. Cl. .................. 260/173; 260/159; 260/169
[58] Field of Search .................. 260/173, 169, 170, 171

[56] References Cited

U.S. PATENT DOCUMENTS

| | | | |
|---|---|---|---|
| 1,716,063 | 6/1929 | Jordan | 260/159 X |
| 1,982,332 | 11/1934 | Taube | 260/173 X |
| 2,024,797 | 12/1935 | Hug et al. | 260/173 |
| 2,488,076 | 11/1949 | Bossard | 260/159 X |
| 2,676,957 | 4/1954 | Armento | 260/172 |
| 3,917,887 | 11/1975 | Stiller | 427/343 |

FOREIGN PATENT DOCUMENTS

| | | | |
|---|---|---|---|
| 2,211,510 | 7/1974 | France | 260/173 |
| 49-39,619 | 4/1974 | Japan | 260/169 |

*Primary Examiner*—Floyd D. Higel
*Attorney, Agent, or Firm*—Gerald D. Sharkin; Richard E. Vila; Melvyn M. Kassenoff

[57] ABSTRACT

Disclosed are compounds of the formula,

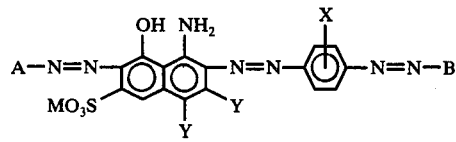

in which X is hydrogen, chlorine, $C_{1-4}$alkyl or alkoxy, $-SO_3M$ or $-CO_2M$,
one of the Y's is hydrogen, the other $-SO_3M$,
A is a mono- or di-sulphonaphthyl radical which is optionally further substituted, or

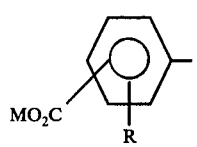

in which R is hydrogen, hydroxy or $C_{1-4}$alkyl or alkoxy,
B is a radical or a coupling component ($b_1$) to ($b_{10}$),

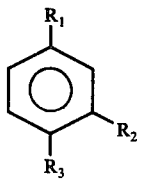
(b₁)

where $R_1$ is $-NH_2$, anilino or toluidino,
$R_2$ is $-NH_2$ or $-OH$, and
either $R_3$ is hydrogen, or
when $R_1$ and $R_2$ both are $-NH_2$, $R_3$ is hydrogen, $-SO_3M$ or $C_{1-4}$alkyl;

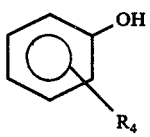

(b₂)

where $R_4$ is hydrogen or $C_{1-4}$alkyl;

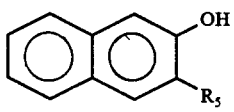

(b₃)

where $R_5$ is hydrogen or $-CO_2M$;

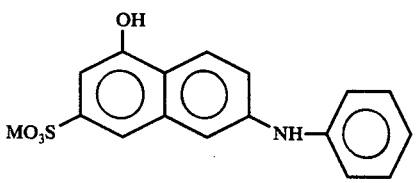

(b₄)

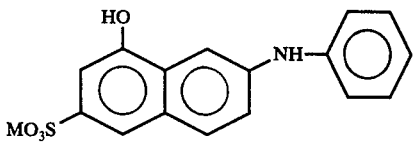

(b₅)

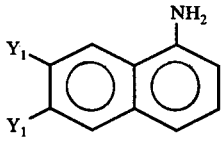

(b₆)

where one of the $Y_1$'s is hydrogen, the other $-SO_3M$;

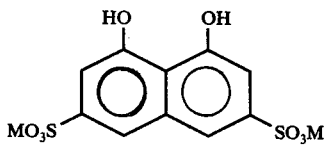

(b₇)

-continued

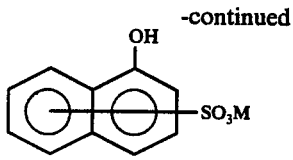 (b₈)

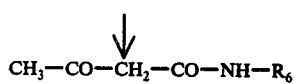 (b₉)

where $R_6$ is phenyl or $C_{1-4}$alkylphenyl;

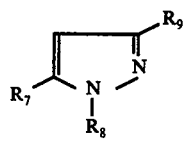 (b₁₀)

where $R_7$ is —OH or —NH$_2$,
$R_8$ is hydrogen, phenyl or sulphophenyl, and
$R_9$ is $C_{1-4}$alkyl or —CO$_2$M, and
the M's independently, signify hydrogen or a non-chromophoric cation, their production and use for dyeing and printing anionic dyeable substrates, e.g., natural and regenerated cellulose, natural and synthetic polyamides, polyurethanes and basically modified polypropylene and particularly leather, paper and anodized aluminum. The obtained dyeings have shades ranging from deep green or blue to black. The dyeings on paper exhibit notable fastness to water and water-spotting while the dyeings on leather are level and exhibit good fastness to perspiration, dry cleaning, water, water-spotting and buffing and resistance to migration onto polyvinyl chloride.

43 Claims, No Drawings

TRISAZO DYES HAVING A 2,7-(1-AMINO-3,6-OR 4,6-DISULFO-8-HYDROXYNAPHTHYLENE) RADICAL

The invention relates to trisazo dyes.

According to the invention there are provided compounds of formula I,

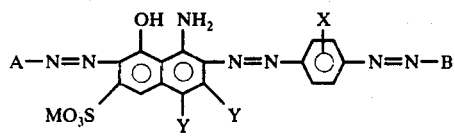

in which X is hydrogen, chlorine, $C_{1-4}$alkyl or alkoxy, $—SO_3M$ or $—CO_2M$, one of the Y's is hydrogen, the other $—SO_3M$, A is a mono- or di-sulphonaphthyl radical which is optionally further substituted, or a radical (a),

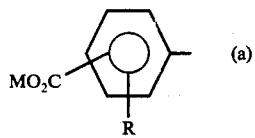

in which R is hydrogen, hydroxy or $C_{1-4}$alkyl or alkoxy,

B is a radical of a coupling component $(b_1)$ to $(b_{10})$, preferably of coupling component $(b_9)$ or $(b_{10})$ and more preferably of coupling component $(b_9)$,

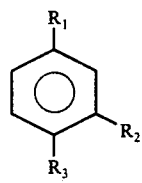

where $R_1$ is $—NH_2$, anilino or toluidino,
$R_2$ is $—NH_2$ or $—OH$, and
either $R_3$ is hydrogen, or
when $R_1$ and $R_2$ both are $—NH_2$, $R_3$ is hydrogen, $—SO_3M$ or $C_{1-4}$alkyl;

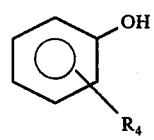

where $R_4$ is hydrogen or $C_{1-4}$alkyl;

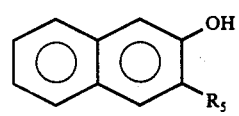

where $R_5$ is hydrogen or $—CO_2M$;

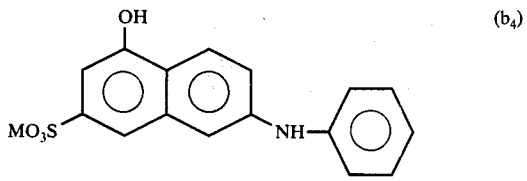

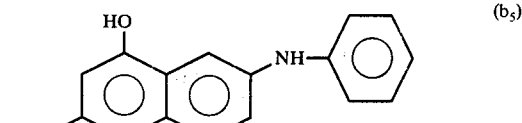

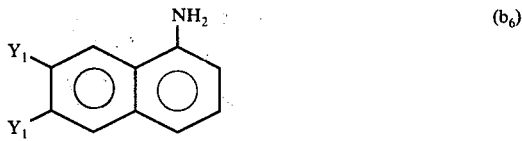

where one of the $Y_1$'s is hydrogen, the other $—SO_3M$;

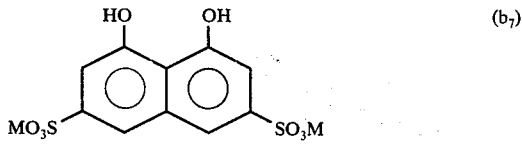

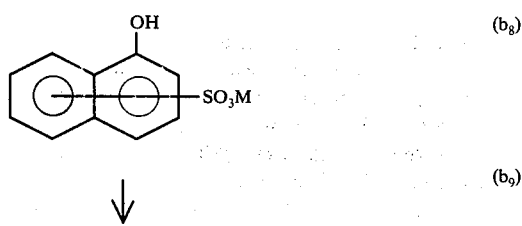

where $R_6$ is phenyl or $C_{1-4}$alkylphenyl;

where $R_7$ is $—OH$ or $—NH_2$, preferably $—OH$,
$R_8$ is hydrogen, phenyl or sulphophenyl, and
$R_9$ is $C_{1-4}$alkyl or $-CO_2M$, preferably $C_{1-4}$alkyl, more preferably methyl; and
the M's, independently, signify hydrogen or a non-chromophoric cation.

The group A is preferably the radical derived from a diazo component derived from an amine $A-NH_2$.

As examples of substituents on any further substituted mono- or di-sulphonaphthyl as A may be given hydroxy and $C_{1-4}$alkoxy, although any substituent normal in corresponding radicals derived from diazo components in the anionic dyestuff art may be employed. Any disulfonaphthyl is, however, preferably not further substituted and any monosulfonaphthyl is preferably unsubstituted or monosubstituted by hydroxy or $C_{1-4}$alkoxy, preferred naphthyl radicals as A being of formula $(a_1)$, $(a_2)$, $(a_3)$, $(a_4)$ or $(a_5)$,

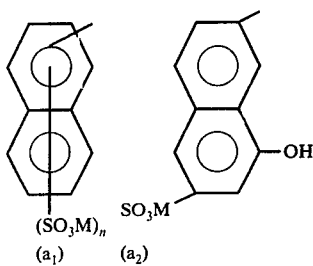

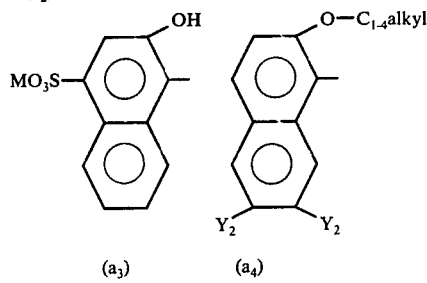

or

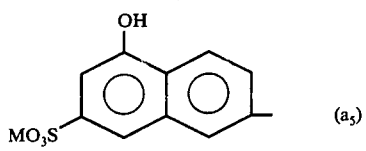

in which M is as defined above, n is 1 or 2, with the proviso that when n is 2, the sulpho groups are not in ortho- and preferably not in peri- relative positions, and one of the $Y_2$'s signifies hydrogen, the other -$SO_3M$.

Examples of radicals ($a_1$), in which n is 2, include 5,7-disulphonaphthyl-2, 6,8-disulphonaphthyl-2, 2,4-disulphonaphthyl-1 and radicals ($a_1'$),

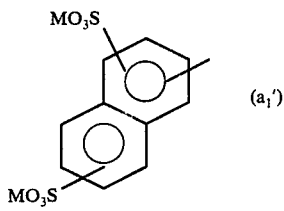

for example 1,5-, 3,6- and 4,8-disulphonaphthyl-2 and 2,5-, 3,6- and 3,8-disulphonaphthyl-1.

The preferred significances of A are the radicals (a), ($a_4$) and ($a_1$), in which n is 1.

Where A is a radical (a), the relative positions of the groups R and -COOM therein are those normally occupied by such groups in diazo components derived from amines A-$NH_2$.

Preferred radicals (a) are the radicals (aa), (ab), (ac) and (ad),

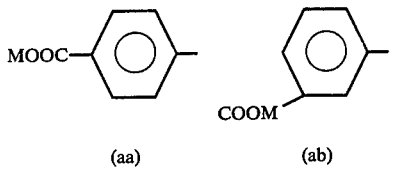

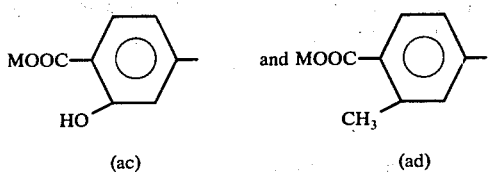

where M is as defined above.

Preferred radicals ($a_1$) are 1-sulphonaphthyl-2 and particularly radicals (ae) and (af),

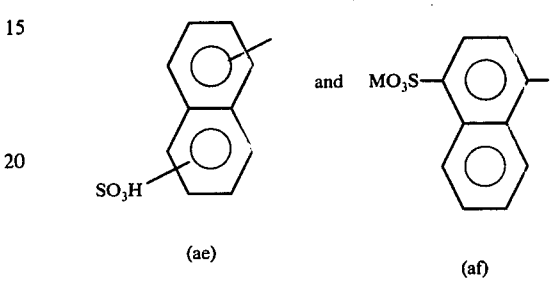

where M is as defined above, the preferred radicals (ae) being 5-, 6- and 7-sulphonaphthyl-1 and 6-, 7- and 8-sulphonaphthyl-2.

Preferred radicals ($a_4$) are the radicals (ag),

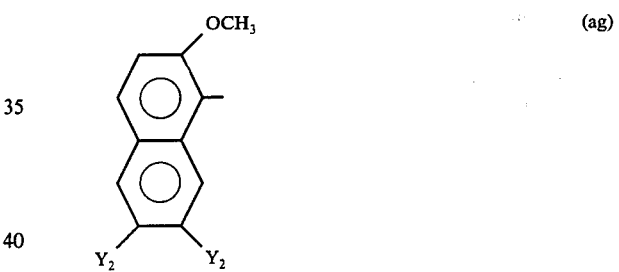

where the $Y_2$'s are as defined above.

The more preferred significances of A are the radicals (aa), (ac), and ($a_1$), in which n is 1, and radicals (af) being particularly preferred.

Preferred coupling components from which B is derived are the coupling components of formula (ba) to (bt),

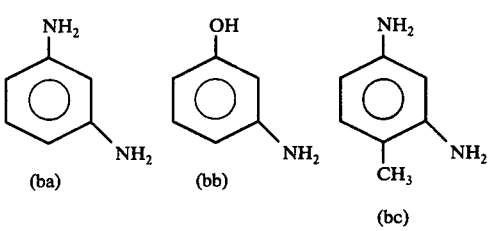

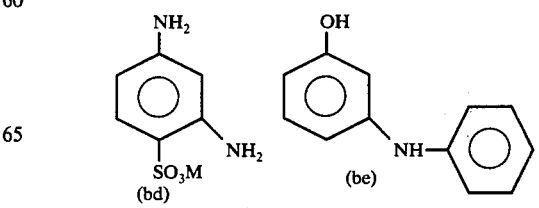

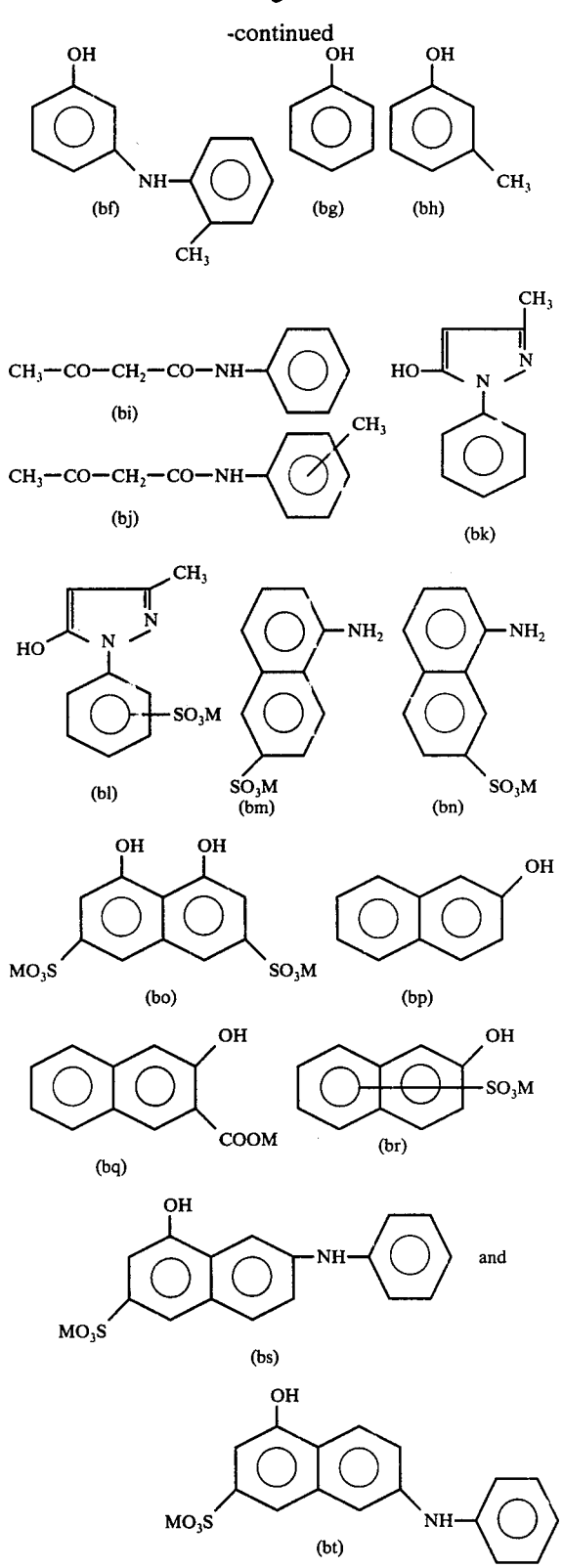

in which M is as defined above, the sulpho group in component (br) preferably being in 4, 6 or 7-position.

Of the above coupling components (ba) to (bt), those of formulae (bk), (bl), (bj) and (bi) are preferred, those of formulae (bj) and (bi) being more preferred, particularly that of formula (bi).

The group X in the compounds of formula I is preferably in ortho position to the central azo grouping. Preferred significances of X are chlorine, hydrogen and sulpho, of which hydrogen and sulpho are more preferred.

Any $C_{1-4}$alkyl of alkoxy group in the compounds of formula I is preferably of 1 or 2 carbon atoms, the preferred such groups being methyl and methoxy.

Where M is a non-chromophoric cation, the exact nature thereof is not critical, cations conventional in the anionic dyestuff art being suitable. As will be appreciated, M may be di- or polyvalent. However, for the sake of simplicity, M is shown in the formulae herein as being monovalent. Preferred cations as M are the alkali-metal, e.g. sodium, potassium and lithium, cations, and the ammonium and substituted ammonium cations, e.g. of the formula $R_{10}R_{11}R_{12}R_{13}N^{\oplus}$ where $R_{10}$, $R_{11}$, $R_{12}$ and $R_{13}$, independently, signify hydrogen, $C_{1-3}$alkyl or $C_{2-3}$hydroxyalkyl. Where any one of $R_{10}$, $R_{11}$, $R_{12}$ and $R_{13}$ signifies hydroxyalkyl, at least one other preferably signifies hydrogen, and the hydroxy group is preferably at least two carbon atoms removed from the nitrogen atom. Specific examples are ammonium, mono-, di- and tri-ethanolammonium, mono-, di and tri-isopropanolammonium cations. The preferred cation as M is the sodium cation. Hence, M is preferably hydrogen or an alkali metal, ammonium or substituted ammonium cation, more preferably hydrogen or sodium.

The compounds of the invention preferably contain 3 to 5 water-solubilising groups ($-SO_3M$ and $-CO_2M$), more preferably 3 or 4 such groups.

As a preferred class of compounds provided by the invention may be given the compounds of formula I',

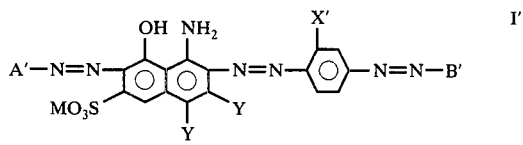

where A' is a radical (aa), (ac), or ($a_1$) wherein n is 1, as defined above, preferably a radical (af), X' is hydrogen, chlorine or $-SO_3M$, preferably hydrogen or $-SO_3M$, B' is a radical of a coupling component (bk), (bl), (bj) or (bi), preferably (bj) or (bi), more preferably (bi), and the Y's and M's are as defined above.

Mixtures of compounds of formula I are embraced by the invention.

The invention also provides a process for the production of compounds of formula I which comprises coupling the diazo derivative of a compound of formula II,

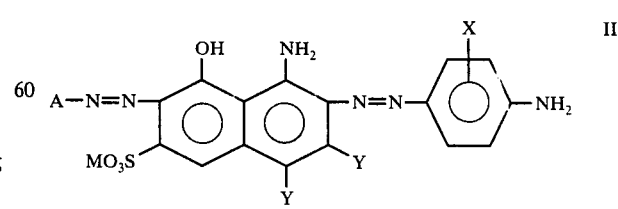

in which A, M, X and the Y's are as defined above, with a coupling component of one of the formulae ($b_1$) to ($b_{10}$), above.

Diazotisation of compounds of formula II and coupling of the resulting diazo derivative with the coupling components may be carried out in conventional manner, e.g. in aqueous or aqueous/organic medium. The coupling may suitably be carried out in the presence of a coupling accelerator. Coupling is preferably effected in neutral to alkaline media, e.g. at a pH of from 7 to 12, particularly where a coupling component of one of the formulae ($b_3$) to ($b_{10}$) is employed.

By the use of mixtures of compounds of formula II and/or of coupling components, mixtures of compounds of formula I may be produced. Alternatively, the mixtures may be obtained by simple admixture of two or more compounds of formula I.

The resulting compounds of formula I and mixtures thereof may be isolated and purified in conventional manner.

The compounds of formula II may be obtained by the following reaction sequence:

(i) Acid coupling of the diazo derivative of an amine of formula IV,

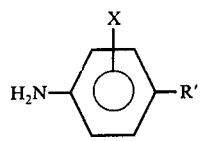
                              IV where X is as defined above, and
R' is NO$_2$ or —NH-acyl, where acyl is an acyl radical conventionally employed for the protection of amino groups, preferably an acid radical of lower alkane carboxylic acyl and most preferably acetyl, with a compound of formula V,

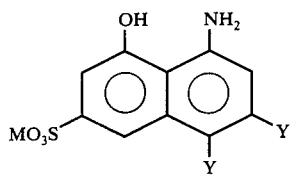
                              V in which the Y's are as defined above,
(ii) subsequently coupling with the resulting azo compound a diazo derivative of an amine of formula VI,

A—NH$_2$                               VI in which A is as defined above,
followed by either
(iiia) reduction of the nitro group in the resulting product, where R' is nitro, or
(iiib) cleavage of the acyl group in the resulting product, where R' is —NH-acyl.

The reactions involved in the above sequence are conveniently carried out in conventional manner. The preferred compounds of formula IV are para-nitroaniline and 2-sulpho-4-nitroaniline.

The compounds of formula I and mixtures thereof are anionic dyes and are useful in the dyeing of anionic dyeable substrates, whether of a textile or non-textile nature. As examples of such substrates may be given natural and regenerated cellulose, natural and synthetic polyamides, polyurethanes, basically modified polypropylene, anodised aluminum, paper and leather, the preferred substrates being paper, anodised aluminum and, especially, leather.

The dyeing may be carried out in conventional manner appropriate to the type of substrate, e.g. exhaust, padding and printing processes. Textile substrates are preferably dyed by exhaust methods, paper preferably in the stock. Leather may be tanned by any conventional process, whether naturally or synthetically, especially chrome or chrome-vegetable tanned.

The dyes provided by the invention give dyeings of deep green or blue to black shades with notable overall fastness properties. The compounds obtained using coupling components ($ba$) to ($bf$) give blackish shades, those obtained using coupling components ($bg$) to ($bl$) green shades, and those obtained using coupling components ($bm$) to ($bt$) blue shades.

The dyeings obtained on paper have notable fastness to water and water-spotting.

The dyes have notable penetrating power in the dyeing of leather, giving notably level dyeings with good all-round fastness properties, e.g. to perspiration, dry cleaning, water, water-spotting and buffing and against migration onto polyvinyl chloride.

The following Examples, in which all parts and percentages are by weight and all temperatures in degrees centigrade, illustrate the invention.

EXAMPLE 1

138 Parts of p-nitroaniline are diazotised in conventional manner with hydrochloric acid and sodium nitrite and coupled at a pH of 1-2.5 with 319 parts of 1-amino-8-hydroxynaphthalene-3,6-disulphonic acid. The diazo compound consisting of 223 parts of 1-amino-4-sulfonaphthalene is coupled at a pH of 9 (adjusted with NaOH) to the resulting monoazo compound to obtain the disazo dye.

The resulting nitro-disazo compound is heated in the reaction mixture to 40° and the nitro group reduced to the amino group by means of a solution of 117 parts of sodium sulphide in water. The resulting aminodisazo dye is separated and filtered off from the reaction solution by adding 2000 parts of sodium chloride and adjusting the pH to 4 with HCl. Dilute hydrochloric acid is added with stirring to the resulting dye which is then diazotized by adding dropwise a sodium nitrite solution. 117 Parts of acetoacetamidobenzene, dissolved in 1000 parts of water and 100 parts of sodium hydroxide solution, are added to the diazotized dye and coupled to the trisazo dye. The resulting dye is precipitated with sodium chloride and hydrochloric acid.

The dried dyestuff is obtained as a dark green powder which dyes leather, paper, natural and synthetic polyamides, cotton and anodised aluminum in dark green shades. It is of the formula

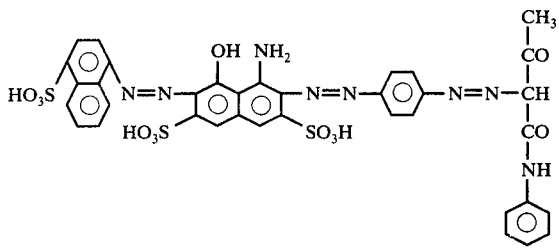

In the following Table, examples of further dyes of formula IX,

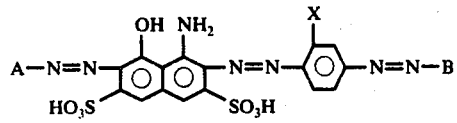

are indicated. Such dyes may be produced in analogy with the process described in Example 1, in free acid or salt form, depending on whether or not acid is employed in their isolation, the table giving the amines of formula (VI), the coupling components of formula (III), the radicals (X) and the shade of the resulting dyeing on leather.

Analogous compounds in which the cation is other than sodium may be provided in analogous manner or by employing ion exchange techniques.

| Exp. No. | A—NH$_2$ | X | b$_1$ - b$_{10}$ | Shade of the dyeing on leather |
|---|---|---|---|---|
| 2 | HOOC—⟨○⟩—NH$_2$ | H | NH$_2$ / ⟨○⟩ / OH | black |
| 3 | " | H | NH$_2$ / ⟨○⟩ / NH$_2$ | " |
| 4 | " | H | OH / ⟨○⟩—NH—⟨○⟩ / CH$_3$ | " |
| 5 | " | H | NH$_2$ / ⟨○⟩—NH$_2$ / CH$_3$ | " |
| 6 | " | SO$_3$H | NH$_2$ / ⟨○⟩ / OH | " |
| 7 | " | SO$_3$H | NH$_2$ / ⟨○⟩ / NH$_2$ | " |
| 8 | " | SO$_3$H | OH / ⟨○⟩—NH—⟨○⟩ / CH$_3$ | " |
| 9 | " | SO$_3$H | NH$_2$ / ⟨○⟩—NH$_2$ / CH$_3$ | " |
| 10 | HO / HOOC—⟨○⟩—NH$_2$ | H | OH / ⟨○⟩ / NH$_2$ | " |
| 11 | " | H | NH$_2$ / ⟨○⟩ / NH$_2$ | " |
| 12 | " | H | OH / ⟨○⟩—NH—⟨○⟩ / CH$_3$ | " |
| 13 | " | H | NH$_2$ / ⟨○⟩—NH$_2$ / CH$_3$ | " |

-continued
| Exp. No. | A—NH$_2$ | X | b$_1$ – b$_{10}$ | Shade of the dyeing on leather |
|---|---|---|---|---|
| 14 | " | SO$_3$H |  | " |
| 15 | " | SO$_3$H |  | " |
| 16 | " | SO$_3$H | 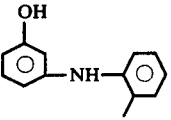 | " |
| 17 | " | SO$_3$H |  | " |
| 18 | 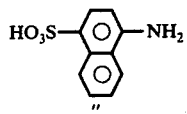 | H |  | " |
| 19 | " | H |  | " |
| 20 | " | H |  | " |
| 21 | " | H | 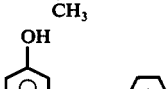 | " |
| 22 | " | H | 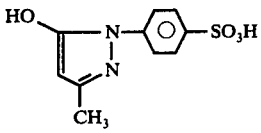 | green |
| 23 | " | SO$_3$H | 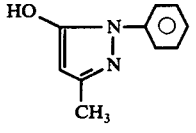 | " |
| 24 | " | " | CH$_3$—CO—CH$_2$—CO—NH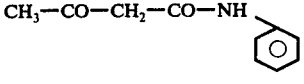 | " |
| 25 | " | H |  | " |
| 26 | " | SO$_3$H |  | " |
| 27 | 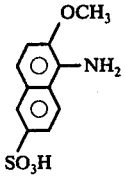 | H | 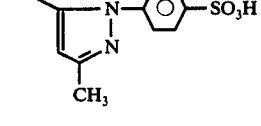 | " |

-continued

| Exp. No. | A—NH$_2$ | X | b$_1$ – b$_{10}$ | Shade of the dyeing on leather |
|---|---|---|---|---|
| 28 | " | SO$_3$H | 5-hydroxy-3-methyl-1-phenylpyrazole | " |
| 29 | " | H | 3-methylphenol (m-cresol) with OH | " |
| 30 | " | H | acetoacetanilide (CH$_2$—CO—NH—C$_6$H$_5$, CO, CH$_3$) | " |
| 31 | 4-aminobenzoic acid (HOOC—C$_6$H$_4$—NH$_2$) | H | 8-amino-naphthalene-6-sulfonic acid | blue |
| 32 | " | H | 8-amino-naphthalene-2-sulfonic acid | " |
| 33 | " | H | 1-hydroxy-3-sulfo-6-phenylamino-naphthalene | " |
| 34 | " | SO$_3$H | 1-hydroxy-3-sulfo-6-phenylamino-naphthalene | " |
| 34a | " | H | " | " |
| 35 | " | SO$_3$H | 2-naphthol | " |
| 36 | 5-amino-naphthalene-1-sulfonic acid | H | 8-amino-naphthalene-6-sulfonic acid | " |
| 37 | " | H | 2-hydroxy-3-naphthoic acid | " |
| 38 | " | H | 1,8-dihydroxy-naphthalene-3,6-disulfonic acid | " |
| 39 | " | H | 1-hydroxy-3-sulfo-6-phenylamino-naphthalene | " |

-continued

| Exp. No. | A—NH$_2$ | X | b$_1$ - b$_{10}$ | Shade of the dyeing on leather |
|---|---|---|---|---|
| 40 | " | H | (naphthalene with OH, SO$_3$H, NH-phenyl) | " |
| 41 | " | SO$_3$H | " | " |
| 42 | " | Cl | CH$_3$-CO-CH$_2$-CO-NH-(phenyl) | green |
| 43 | " | OCH$_3$ | " | " |
| 44 | (naphthalene with NH$_2$, SO$_3$H) | H | " | " |
| 45 | " | Cl | " | " |
| 46 | " | OCH$_3$ | " | " |
| 47 | (naphthalene with NH$_2$, SO$_3$H) | H | " | " |
| 48 | " | Cl | " | " |
| 49 | " | OCH$_3$ | " | " |
| 50 | (naphthalene with NH$_2$, SO$_3$H) | H | " | " |
| 51 | " | Cl | " | " |
| 52 | " | OCH$_3$ | CH$_3$-CO-CH$_2$-CO-NH-(phenyl) | |
| 53 | (naphthalene with NH$_2$, SO$_3$H) | H | " | " |
| 54 | " | Cl | " | " |
| 55 | " | OCH$_3$ | " | " |
| 56 | (naphthalene with OH, HO$_3$S, NH$_2$) | H | " | bluish-green |
| 57 | (naphthalene with HO$_3$S, NH$_2$) | Cl | CH$_3$-CO-CH$_2$-CO-NH-(phenyl)-CH$_3$ | green |
| 58 | " | H | " | " |
| 59 | " | OCH$_3$ | " | " |
| 60 | (naphthalene with NH$_2$, SO$_2$H) | H | " | " |
| 61 | " | Cl | " | " |
| 62 | " | OCH$_3$ | " | " |
| 63 | (naphthalene with NH$_2$, SO$_3$H) | H | " | " |
| 64 | " | Cl | " | " |

-continued

| Exp. No. | A—NH$_2$ | X | b$_1$ – b$_{10}$ | Shade of the dyeing on leather |
|---|---|---|---|---|
| 65 | 1-amino-6-sulfo-naphthalene (NH$_2$ and HO$_3$S on naphthalene) | OCH$_3$ | " | " |
| 66 | 2-amino-6-sulfo-naphthalene (NH$_2$ and SO$_3$H on naphthalene) | H | " | " |
| 67 | " | Cl | " | " |
| 68 | " | OCH$_3$ | " | " |
| 69 | 2-amino-1-sulfo-naphthalene (NH$_2$ and SO$_3$H on naphthalene) | H | " | " |
| 70 | " | Cl | " | " |
| 71 | " | OCH$_3$ | " | " |
| 72 | 1-amino-2-hydroxy-4-sulfo-naphthalene (OH, NH$_2$, HO$_3$S on naphthalene) | H | " | bluish-green |
| 73 | 1-amino-sulfo-naphthalene (HO$_3$S, NH$_2$ on naphthalene) | H | 6-hydroxy-naphthalene-2-sulfonic acid (OH and SO$_3$H on naphthalene) | blue |
| 74 | " | H | 3-hydroxy-naphthalene-1-sulfonic acid (OH and HO$_3$S on naphthalene) | " |
| 75 | " | H | 6-hydroxy-naphthalene-2-sulfonic acid (OH and SO$_3$H on naphthalene) | " |
| 76 | HOOC—C$_6$H$_4$—NH$_2$ | H | 6-hydroxy-naphthalene-2-sulfonic acid (OH and SO$_3$H on naphthalene) | " |
| 77 | " | H | CH$_2$—CO—NH—C$_6$H$_5$ with CO—CH$_3$ branch | green |
| 78 | 2-amino-naphthalene-1,6-disulfonic acid (SO$_3$H, NH$_2$, HO$_3$S on naphthalene) | H | " | " |

| Exp. No. | A—NH$_2$ | X | b$_1$ - b$_{10}$ | Shade of the dyeing on leather |
|---|---|---|---|---|
| 79 | 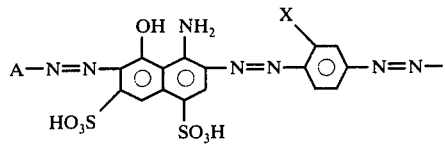 | H | " | " |

EXAMPLES 1' to 79'

The sodium slats of the compounds of formula $$A-N=N-\underset{HO_3S}{\overset{OH\ NH_2}{\underset{SO_3H}{\bigcirc\bigcirc}}}-N=N-\underset{}{\overset{X}{\bigcirc}}-N=N-B \qquad IXa$$

are obtained in analogous manner to the products of Examples 1 to 79 employing 1-amino-8-hydroxynaphthalene-4,6-disulphonic acid in place of the 1-amino-8-hydroxynaphthalene-3,6-disulphonic acid.

DYEING EXAMPLE 1

An aluminum alloy containing 1.5% magnesium (Paraluman 150) is anodised in chromic acid (100 g CrO$_3$/1) with 40 volt direct current at 43°, over the course of 45 minutes. It is then thoroughly rinsed in water. Dyeing is subsequently effected at a pH of 6.5 and at a temperature of 60°, over the course of 15 minutes in a solution of 10 g/1 of the dyestuff of Example 1. Finally, the aluminum is treated over the course of 30 minutes in boiling water. A dark green dyeing is obtained.

DYEING EXAMPLE 2

An aluminum alloy containing 1.5% magnesium (Paraluman 150) is anodised in sulphuric acid (200 g/1) with a direct current of 12 A/dm$^2$, at 35°, over the course of 1.5 minutes. It is then thoroughly rinsed in water. Dyeing is then effected at a pH of 6.5 and at a temperature of 60° in a solution of 10 g/1 of the dyestuff of Example 1. The aluminum is then treated, over the course of 30 minutes, in boiling water. A dark green dyeing is obtained.

DYEING EXAMPLE 3

A cupriferous aluminum cast alloy (7075) is anodised in sulphuric acid (200 g/1) at 20° C, over the course of 30 minutes with 1.5 A/dm$^2$. It is thoroughly rinsed in water and dyeing is effected in a solution of 10 g/1 of the dyestuff of Example 1, at a pH of 6.5 and at a temperature of 60°, over the course of 15 minutes. The aluminum is then treated over the course of 30 minutes in boiling water. A dark green dyeing is obtained.

DYEING EXAMPLE 4

100 Parts of newly tanned and neutralised chrominum grain leather are milled in a dyeing vessel for 30 minutes in a liquor of 250 parts of water at 55° and 1 part of the dyestuff illustrated by Example 1. They are further treated for 30 minutes in the same bath with 2 parts of an anionic fat liquor based on suphonated train oil. The leathers are dried and curried in the usual manner. A very evenly dyed leather in dark green shade is obtained.

DYEING EXAMPLE 5

100 Parts of calf suede leather are milled for 4 hours in a dyeing vessel with 1000 parts of water and 2 parts of ammonia and subsequently dyed in a fresh bath containing 500 parts of water at 55°, 2 parts of ammonia 10 parts of the dissolved dyestuff, described in Example 1, for 1 hour and 30 minutes. In order to exhaust the bath, 4 parts of formic acid (85%) are slowly added and dyeing is continued until the dyestuff has been completely fixed. The suede leathers are rinsed, dried and curried in the usual manner. After buffing of the suede side, the leathers are very evenly dyed in deep dark green shades.

DYEING EXAMPLE 6

100 Parts of chrome vegetable tanned lamb's leather, 10 parts of the dyestuff obtained in Example 1 are milled for 45 minutes in a dyeing vessel in a liquor consisting of 1000 parts of water at 55° and 1.5 parts of an anionic sperm oil emulsion. The dyestuff is fixed on the leather by slowly adding 5 parts of formic acid (85%) over the course of 30 minutes. The leather which is dried and curried in the usual manner is obtained in dark green shades of good levelness.

DYEING EXAMPLE 7

260 ml of water at 50°-60° are poured into a dye beaker of 500 ml of volume, which is placed into a heatable water bath. 10 ml of 10% sodium sulphate solution and 1 ml of 10% sodium sulphate solution and 1 ml of 10% sodium carbonate solution are added. 0.25 of the dyestuff of Example 1 is formed into a paste with 2 ml of cold water, and 30 ml of warm water (50°-60°) are added; the dyestuff dissolves. The dye solution is added to the bath and 10 g of cotton fabric is continuously kept moving in this dyebath. The temperature of the dyebath is increased to 85°-90° over the course of 30 minutes and dyeing is continued at this temperature over the course of 60 minutes. The dyed material is taken out of the dyebath, the adherent liquor is removed by wringing, the material rinsed with cold water for 5 to 10 minutes and dried at 60°-70°. A dark green dyed fabric is obtained.

DYEING EXAMPLE 8

(a) 100 Parts of chemically bleached sulphite cellulose (obtained from coniferous or deciduous wood) are ground in a hollander beater in 2000 parts of water. 4 Parts of the dyestuff of Example 1 are added to this mass in the form of a powder or as solution. After 15 minutes, sizing is effected and fixation subsequently take place. Paper produced from this mass has a dark green dyeing with good wet fastness.

(b) 70 Parts of chemically bleached sulphite cellulose (obtained from coniferous wood) and 30 parts of chemically bleached sulphate cellulose (obtained from birch wood) are spread in a pulper in 2000 parts of water. 0.4 Parts of the dyestuff of Example 1 are scattered in. After 20 minutes, paper is produced from this mass. The obtained paper is dyed in green shades and has good fastnesses. Similar results are obtained if the dyestuff is added to the mass in the form of a solution.

Replacing in the above dyeing Examples 1-8 the dyestuff of Example 1 by the dyestuffs of Examples 2-79 or 1' to 79', corresponding black, blue and green dyeings are obtained.

In the above dyeing Examples, the compounds of the invention are combined with sodium carbonate in an amount such that, in water, a pH of 7-8 is obtained.

What is claimed is:

1. A compound of the formula

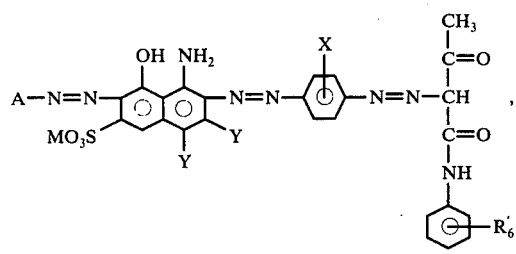

or a mixture thereof,
wherein A is sulfonaphthyl, substituted sulfonaphthyl, disulfonaphthyl, substituted disulfonaphthyl or

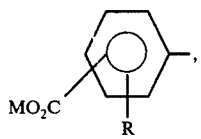

wherein R is hydrogen, hydroxy, $C_{1-4}$alkyl or $C_{1-4}$alkoxy, and
each substituent of substituted sulfonaphthyl and substituted disulfonaphthyl is independently hydroxy or $C_{1-4}$alkoxy,
X is hydrogen, chloro, $C_{1-4}$alkyl, $C_{1-4}$alkoxy, —$SO_3M$ or —$CO_2M$,
one Y is —$SO_3M$ and the other is hydrogen,
$R_6'$ is hydrogen or $C_{1-4}$alkyl, and
each M is independently hydrogen or a non-chromophoric cation.

2. A mixture of compounds according to claim 1.
3. A compound according to claim 1.
4. A compound according to claim 3 wherein each M is independently hydrogen, lithium, sodium, potassium or

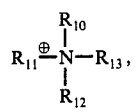

wherein each of $R_{10}$, $R_{11}$, $R_{12}$ and $R_{13}$ is independently hydrogen, $C_{1-3}$alkyl or $C_{2-3}$hydroxyalkyl, with the provisos that at least one of $R_{10}$, $R_{11}$, $R_{12}$ and $R_{13}$ is hydrogen when one or more of $R_{10}$, $R_{11}$, $R_{12}$ and $R_{13}$ is $C_{2-3}$hydroxyalkyl, and the hydroxy group of each $C_{2-3}$hydroxyalkyl is not attached to the carbon atom attached to the nitrogen atom.

5. A compound according to claim 4 wherein each M is independently hydrogen or sodium.
6. A compound according to claim 5 wherein each M is hydrogen.
7. A compound according to claim 5 wherein each M is sodium.
8. A compound according to claim 3 wherein the total number of —$SO_3M$ and —$CO_3M$ groups is 3 or 4.
9. A compound according to claim 3 wherein A is sulfonaphthyl, sulfonaphthyl monosubstituted by hydroxy or $C_{1-4}$alkoxy, disulfonaphthyl or

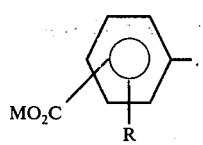

10. A compound according to claim 9 wherein A is

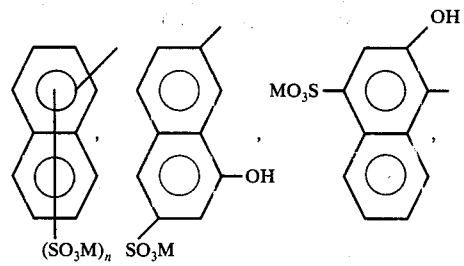

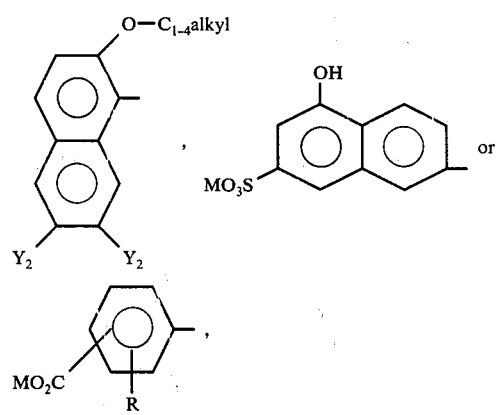

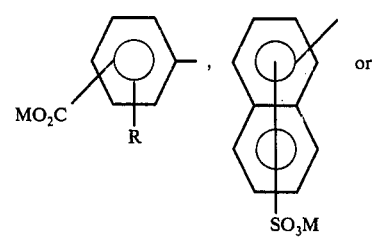

wherein one $Y_2$ is —$SO_3M$ and the other is hydrogen, and
$n$ is 1 or 2,
with the proviso that when $n$ is 2 the —$SO_3M$ groups are not ortho to each other.

11. A compound according to claim 10 wherein A is

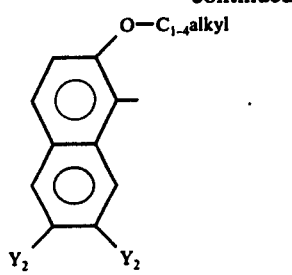
12. A compound according to claim 11 wherein A is
13. A compound according to claim 11 wherein A is
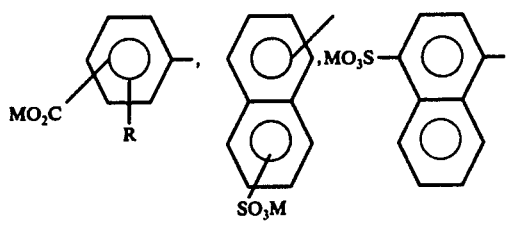
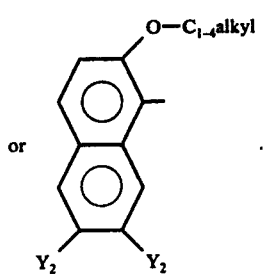
14. A compound according to claim 13 wherein A is
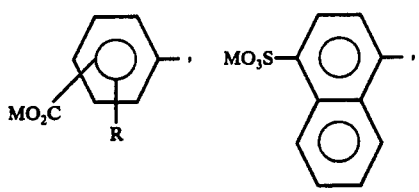
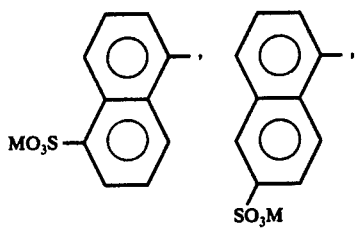
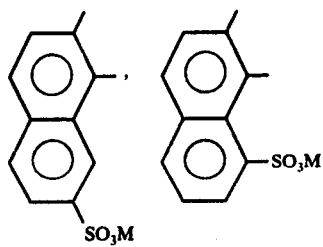
or
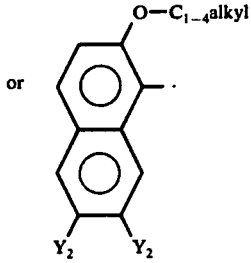
15. A compound according to claim 11 wherein A is
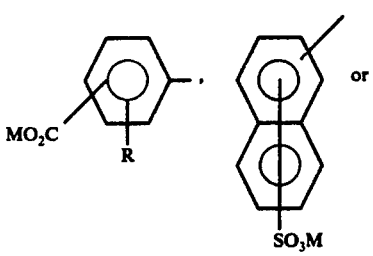
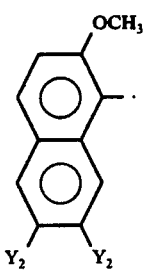
16. A compound according to claim 11 wherein A is
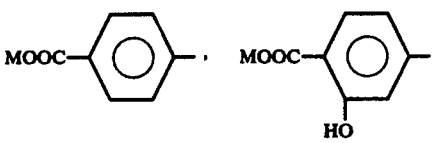
or
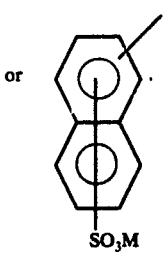
17. A compound according to claim 3 wherein $R_6'$ is hydrogen or methyl.

18. A compound according to claim 17 wherein $R_6'$ is hydrogen.

19. A compound according to claim 3 having the formula

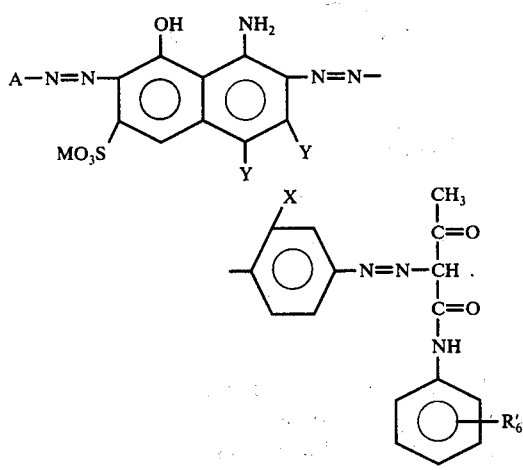

20. A compound according to claim 19 wherein X is hydrogen, chloro or —$SO_3M$.

21. A compound according to claim 20 wherein X is hydrogen or —$SO_3M$.

22. A compound according to claim 3 wherein A is

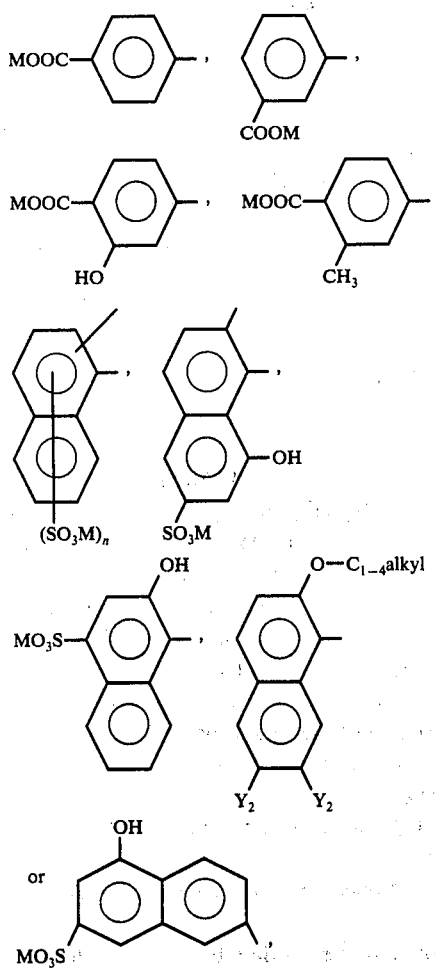

wherein one $Y_2$ is —$SO_3M$ and the other is hydrogen, and n is 1 or 2, with the proviso that when n is 2 the —$SO_3M$ groups are not ortho or peri to each other, and each M is independently hydrogen, lithium, sodium, potassium or

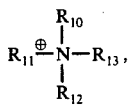

wherein each of $R_{10}$, $R_{11}$, $R_{12}$ and $R_{13}$ is independently hydrogen, $C_{1-3}$alkyl or $C_{2-3}$hydroxyalkyl, with the provisos that at least one of $R_{10}$, $R_{11}$, $R_{12}$ and $R_{13}$ is hydrogen when one or more of $R_{10}$, $R_{11}$, $R_{12}$ and $R_{13}$ is $C_{2-3}$hydroxyalkyl, and the hydroxy group of each $C_{2-3}$hydroxyalkyl is not attached to the carbon atom attached to the nitrogen atom.

23. A compound according to claim 22 having the formula

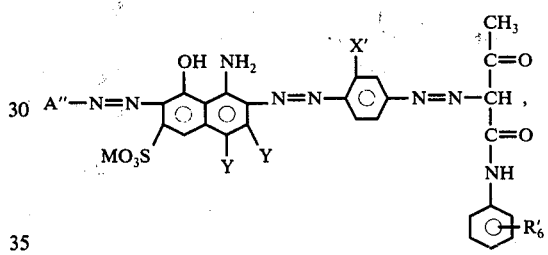

wherein A″ is

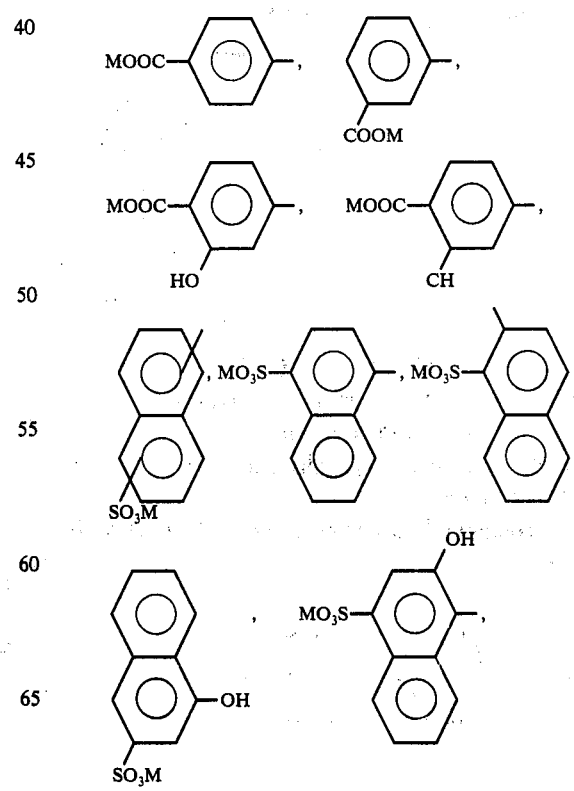

-continued

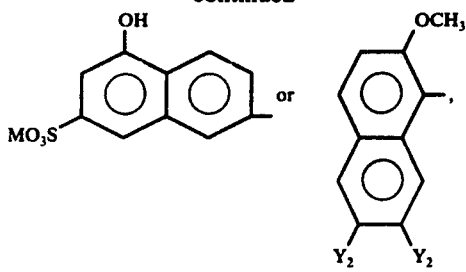

and

X' is hydrogen, chloro or —SO₃M.

24. A compound according to claim 23 wherein each M is hydrogen or sodium.

25. A compound according to claim 24 wherein each M is sodium.

26. A compound according to claim 3 having the formula

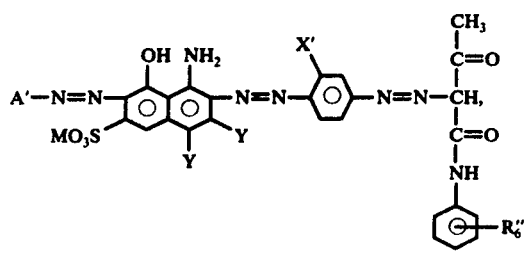

wherein A' is

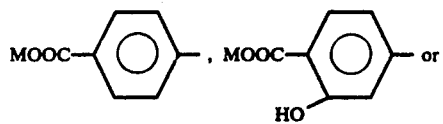,

X' is hydrogen, chloro or —CO₃M,
one Y is —SO₃M and the other is hydrogen,
$R_6''$ is hydrogen or methyl, and
each M is independently hydrogen or a non-chromophoric cation.

27. A compound according to claim 26 having the formula

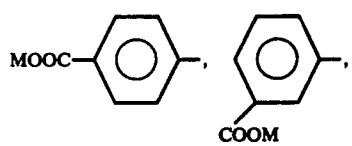

-continued

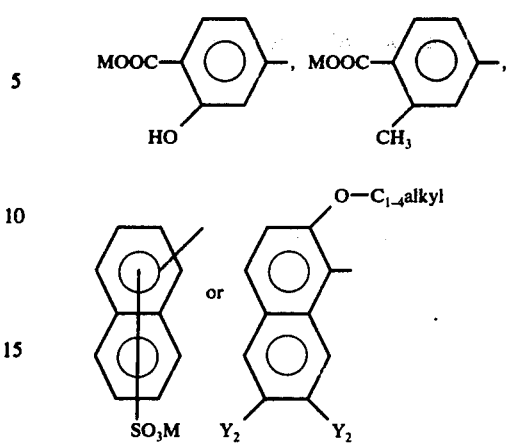

28. A compound according to claim 27 wherein each M is hydrogen or sodium.

29. A compound according to claim 26 having the formula

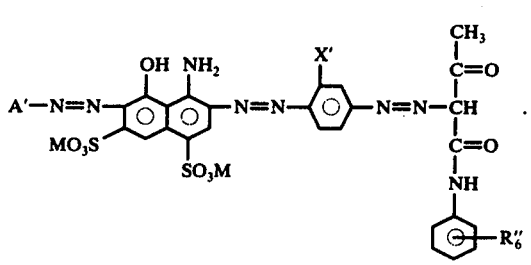

30. A compound according to claim 29 wherein each M is hydrogen or sodium.

31. A compound according to claim 26 wherein each M is independently hydrogen, lithium, sodium, potassium or

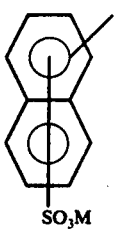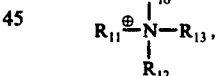

wherein each of $R_{10}$, $R_{11}$, $R_{12}$ and $R_{13}$ is independently hydrogen, $C_{1-3}$alkyl or $C_{2-3}$hydroxyalkyl, with the provisos that at least one of $R_{10}$, $R_{11}$, $R_{12}$ and $R_{13}$ is hydrogen when one or more of $R_{10}$, $R_{11}$, $R_{12}$ and $R_{13}$ is $C_{2-3}$hydroxyalkyl, and the hydroxy group of each $C_{2-3}$hydroxyalkyl is not attached to the carbon atom attached to the nitrogen atom.

32. A compound according to claim 31 wherein each M is independently hydrogen or sodium.

33. A compound according to claim 32 wherein each M is hydrogen.

34. A compound according to claim 32 wherein each M is sodium.

35. A compound according to claim 26 wherein $R_6''$ is hydrogen.

36. A compound according to claim 26 wherein A' is

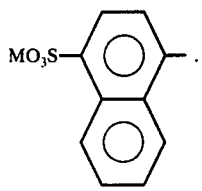

37. A compound according to claim 26 wherein X' is hydrogen or —SO₃M.

38. A compound according to claim 37 having the formula

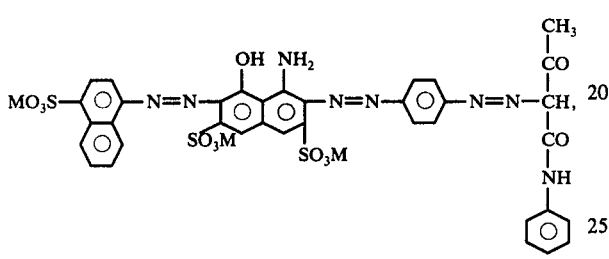

wherein each M is independently hydrogen or a non-chromophoric cation.

39. A compound according to claim 37 wherein each M is hydrogen.

40. A compound according to claim 37 having the formula

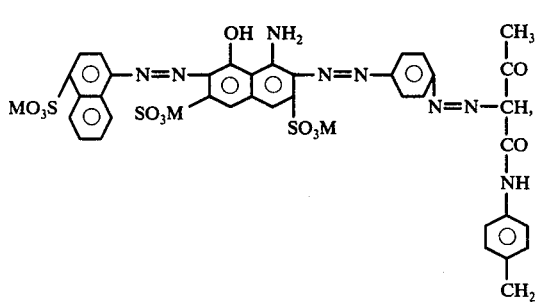

wherein each M is independently hydrogen or a non-chromophoric cation.

41. A compound according to claim 40 wherein each M is hydrogen or sodium.

42. A compound according to claim 10 wherein A is

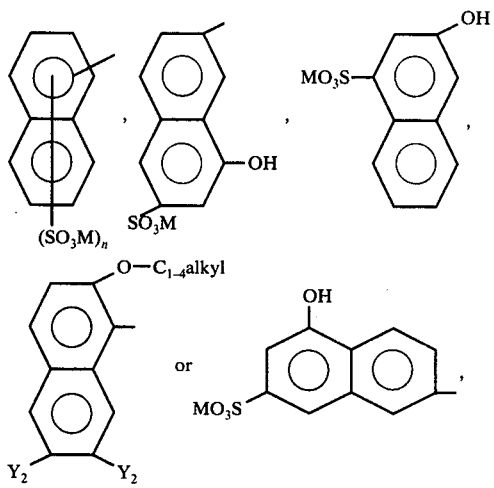

wherein one $Y_2$ is —SO₃M and the other is hydrogen, and n is 1 or 2, with the proviso that when n is 2 the —SO₃M groups are not ortho to each other.

43. A compound according to claim 37 having the formula

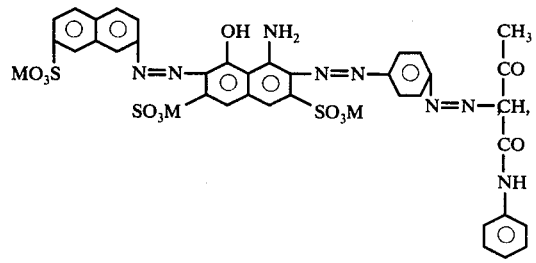

wherein each M is independently hydrogen or a non-chromophoric cation.

* * * * *